A. GLASER.
SPOOL OR BOBBIN.
APPLICATION FILED MAY 19, 1909.
1,056,019.
Patented Mar. 18, 1913.
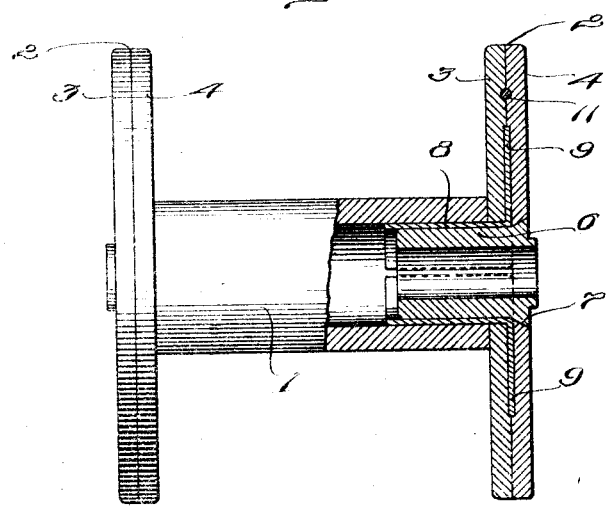
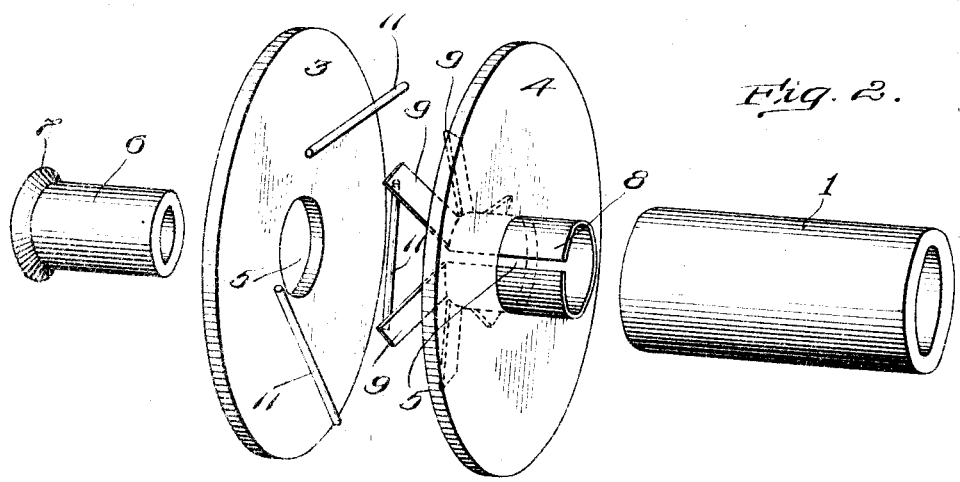
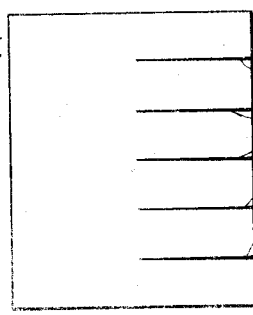
Witnesses:
A. C. Richardson
R. A. Simonds
Inventor.
Alois Glaser
by
Phillips, Van Everen & Fish
Attys

UNITED STATES PATENT OFFICE.

ALOIS GLASER, OF EAST DEDHAM, MASSACHUSETTS, ASSIGNOR TO MARSHALL, SON & COMPANY, INC., OF BOSTON, MASSACHUSETTS, A CORPORATION OF MASSACHUSETTS.

SPOOL OR BOBBIN.

1,056,019.  Specification of Letters Patent.  Patented Mar. 18, 1913.

Application filed May 19, 1909. Serial No. 496,881.

*To all whom it may concern:*

Be it known that I, ALOIS GLASER, a citizen of the United States, residing at East Dedham, in the county of Norfolk and State of Massachusetts, have invented certain new and useful Improvements in Spools or Bobbins; and I do hereby declare the following to be a full, clear, and exact description of the invention, such as will enable others skilled in the art to which it appertains to make and use the same.

The present invention relates to spools or bobbins.

The object of the present invention is to provide a spool or bobbin which shall be cheap to construct, of great strength and durability, and not liable to distort or warp under varying conditions of temperature and moisture.

With these objects in view the present invention consists of the spool or bobbin hereinafter described and more particularly defined in the claims.

In the accompanying drawings which illustrate a form of the present invention particularly adapted for use with wire or similar material, Figure 1 is a front view partly in elevation and partly in section of my improved spool or bobbin; Fig. 2 is a perspective of the various parts forming one end of the spool, showing their relative positions and method of assembling; and Fig. 3 shows the manner of cutting a flat piece of material to form the sleeve with its radiating arms.

As shown in the drawings, the spool comprises a cylindrical body portion or barrel 1 to each end of which are attached the heads or flanges 2, the end of the barrel engaging the inner surface of the head or flange. The barrel may be of varying length and diameter and of any suitable material, such as wood, fiberboard, or paper, according to the particular requirements of the use to which the finished spool is to be put. The barrel is provided at each end with a circular axial recess to receive the sleeve and bushing shortly to be described, and in the form illustrated in the drawings these recesses are connected at their inner ends to form one continuous aperture or passage throughout the entire length of the barrel. The heads or flanges 2 of the spool are shown as each composed of two circular disks 3 and 4, preferably formed of fiberboard, and each provided with a central circular aperture 5. The heads or flanges are attached to the barrel by means of bushings 6 preferably formed of wood and secured in the ends of the barrel, the outer ends of the bushing being provided with flanges 7 which in the preferred construction are inwardly beveled. When the bushing is forced into the recess in the barrel as hereinafter described, the flange of the bushing forces and holds the spool head or flange securely against the end of the barrel.

In order to prevent all possibility of the heads being detached from the barrel or of becoming loose or turning with respect thereto, means have been provided which are shown in the drawings as a split sleeve 8, having the radiating arms 9, the sleeve being fixedly held between the body of the bushing and the inside of the barrel and the arms being secured between the engaging faces of the two disks, which form each head or flange. The sleeve with its arms may very conveniently be formed from a single piece of sheet material, such as fiberboard, of the shape shown in Fig. 3, a series of parallel cuts 10 extending from one edge part way across to the opposite edge. The uncut portion may then be rolled into cylindrical shape and the separated strips bent at right angles thereto to form the arms.

Spools of the general type illustrated in the accompanying drawings not only are subjected to much hard usage and abuse, but in many lines of manufacture are obliged to withstand extremes of temperature and moisture, particularly when used for yarn in connection with textile machinery. While warping and distortion of the heads of the spool thus far described under such conditions may be largely avoided by causing the grain or fiber of the two disks forming each head or flange to cross, and furthermore, such tendency as remains will be resisted to some extent by the arms 9, particularly if a comparatively heavy fiberboard be used for the sleeve and arms, still, in the preferred embodiment of the present invention, reinforcing pieces will be provided, such, for example, as metal rods or short lengths of wire 11, which may be arranged as shown in the drawings like chords, but with their ends within the periphery of disks.

The parts are assembled with the disks and sleeve in temper, that is, somewhat softened by water or in some other manner, and a suitable glue or paste is employed to secure the various parts together. After assembling the parts are subjected to a very heavy pressure, which forces the beveled flange of the bushing into the outer of the disks forming the heads, and embeds the arms and reinforcing pieces practically half way into each disk so that at the periphery, as well as at all other points, except directly beneath the arms and pieces, the disks will be in close contact, forming practically an integral reinforced head provided with a projecting sleeve or flange.

Although the drawings show the arm as projecting from a single split sleeve which almost entirely surrounds the body of the bushing, it is obvious that instead of the sleeve one or more pieces of greater or less width may be employed, which shall be secured between the bushing and the barrel, and from which project the arm or arms which are attached to the head or flange.

In the preferred form of the present invention, as shown and above described, each head or flange is formed of two disks, between which and partly embedded in the faces of each, are the arms 9. Except where so specified in the claims, the present invention is not limited to such a construction, as in one aspect it contemplates broadly the securing of the head to the barrel with the end of the barrel engaging the inner face of the spool head by means of a flanged bushing and means gripped between the bushing and the barrel and embedded or otherwise attached to the spool head to hold the same from rotation relatively to the barrel.

Having thus explained the nature of the present invention and described one embodiment thereof, what is claimed is:

1. A spool or bobbin, having, in combination, a cylindrical barrel provided with a circular axial recess at each end, a head or flange at each end of the barrel, the end of the barrel engaging the inner face of the flange, said flange having a central aperture, a plug or bushing passing through said aperture and entering the recess in the barrel, said plug or bushing being provided with a flange or head at its outer end directly engaging the spool flange to hold the spool flange securely against the end of the barrel, an expansible sleeve within the axial recess in the barrel and gripped between the bushing and the barrel, and means projecting from the sleeve and secured to the spool head or flange to hold said head or flange from rotation relatively to the barrel, substantially as described.

2. A spool or bobbin, having, in combination, a cylindrical barrel provided at each end with a circular axial recess, a head or flange at each end of the barrel, the end of the barrel engaging the inner face of the flange, said flange having a central aperture, a plug or bushing passing through said aperture and entering the recess in the barrel, said plug or bushing being provided with a flange or head at its outer end to hold the spool flange securely against the end of the barrel, and means extending into the axial recess in the barrel and gripped between the bushing and the barrel and embedded in the spool head or flange to hold said head or flange from rotation relatively to the barrel, substantially as described.

3. A spool or bobbin, having, in combination, a cylindrical barrel provided with a circular axial recess at each end, a head or flange at each end of the barrel, the end of the barrel engaging the inner face of the flange, said flange comprising two disks secured together, each provided with a central aperture, a plug or bushing passing through said apertures and entering the recess in the barrel, said plug or bushing being provided with a head or flange at each outer end to hold the spool flange securely against the end of the barrel, a split sleeve within the axial recess in the barrel and gripped between the bushing and the barrel, and arms radiating from the sleeve and extending between the two disks forming the spool head or flange to hold said flange from rotation relatively to the barrel, substantially as described.

In testimony whereof I affix my signature in presence of two witnesses.

ALOIS GLASER.

Witnesses:
ANDREW J. McGLINCHEY,
CLARENCE H. FORNEY.

---

Copies of this patent may be obtained for five cents each, by addressing the "Commissioner of Patents, Washington, D. C."